Patented Dec. 13, 1932

1,890,774

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF MAKING DUST DISINFECTANTS

No Drawing.    Application filed December 20, 1927. Serial No. 241,461.

This invention relates to an improvement in the process of making dust disinfectants, and more particularly to making such disinfectants in a one-step process.

Heretofore the making of dust disinfectants containing organic mercury has involved several separate and distinct steps. It has been necessary, first, to dissolve the organic compound in a suitable solvent and to treat this with a solution of a suitable mercury compound such as mercuric acetate or chloride; second, to separate the organic mercury compound from the liquid in which the reaction was carried out and dry it; and, third, to mix the dried material with suitable diluents such as lime, colloidal clay, etc.

An object of this invention is an improved process of making dust disinfectants containing organic mercury compounds. A further object of this invention is the making of these dust disinfectants in a one-step process. Other objects will appear as the description proceeds.

I have discovered that I can make these dust disinfectants by a one-step process, without either dissolving the reacting components in a solvent or even suspending them in a liquid medium, by simply insuring intimate contact between the organic compound and the mercury compound, preferably in the presence of a finely divided solid diluent, the mercurizing reaction thus taking place in the absence of any liquid diluent and giving directly, without any process of drying, a product in dust form containing an organic mercury compound. In some cases the reaction takes place without heating, while in other cases it is advisable to apply heat. When heat is used temperatures of from 10° C. to 50° C. are applied by means of a hot plate or the like.

In order to disclose the invention in more detail, the following examples of actual embodiments thereof are presented, but it is to be understood that these examples are for illustrative purposes solely, and that they are not to be taken as a limitation in any way of my invention.

Example 1

300 parts of mercuric chloride are placed in a ball mill with 93 parts of chlorphenol, 425 parts of sodium carbonate and 182 parts of hydrated lime. The mill is closed and the mixture is ground therein for a period of 12 to 15 hours. The mill is then opened and the dry product discharged. The material thus obtained, consisting of a mixture of chlorphenol mercury, with inorganic salts, is suitable for use, without further treatment, as a (dust) disinfectant for seeds and plants, or for other disinfecting purposes. It can also, if desired, be dissolved or suspended in water, and the solution or suspension can then be used for the treatment of seeds, etc.

Example 2

45 parts of chlorphenol is mixed with 400 parts of kaolin, known to the trade as Tolanite in a ball mill for an hour. 100 parts of mercuric chloride and 455 parts of hydrated lime are then added and the entire mixture is ground for 15 hours. The reaction takes place in the dry state as in Example 1. It is then discharged from the mill, ready to be packed for shipment.

Example 3

100 parts of mercuric acetate, 50 parts of beta-naphthol, and 850 parts of hydrated lime are ground together in a suitable mill until substantially complete mercurization of the organic compound has taken place. The reaction takes place in the dry state as in Example 1.

Example 4

34 parts of aniline, 100 parts mercuric chloride, and 866 parts of hydrated lime are ground together until mercurization is complete. The reaction takes place in the dry state as in Example 1.

Example 5

100 parts of mercuric acetate, 31 parts phenol, and 869 parts infusorial earth are intimately mixed until mercurization is substantially complete. The reaction takes place in the dry state as in Example 1.

Example 6

100 parts of mercuric oxide, precipitated on 900 parts of magnesium oxide by interaction of the latter with mercuric chloride, are intimately mixed with 50 parts of o-cresol until mercurization is substantially complete. The reaction takes place in the dry state as in Example 1.

By the term "in the dry state" as used in the specification and claims of this application, it will be understood, of course, that I do not necessarily mean in the complete absence of water. The ingredients are ordinarily mixed in the state of dryness in which they are commercially available, in which case a small percentage of water is present as is well known.

While I have mentioned only certain organic compounds in the above examples, this process may be applied to a wide variety of organic compounds which are susceptible of mercurization by methods previously known. Also, it is possible to use in my new process, any mercury compound which is suited to the mercurization of organic compounds by the procedures heretofore known.

As many apparently widely different embodiments of this invention may be made without departing from the spirit thereof, it is to be understood that I do not limit myself to the foregoing examples or descriptions except as indicated in the following patent claims.

I claim:

1. The process of making disinfectants which comprises effecting a reaction by grinding in the dry state, between an organic aromatic cyclic compound and a mercury compound taken from a group consisting of a mercuric salt and mercuric oxide, and obtaining the mercurized product directly in dust form.

2. The process of making disinfectants which comprises effecting a reaction by grinding in the dry state at greater than room temperature between an aromatic cyclic compound and a mercury compound taken from a group consisting of a mercuric salt and mercuric oxide, and obtaining the mercurized product directly in dust form.

3. The process of making disinfectants which comprises effecting a reaction by grinding in the dry state, and in the presence of a finely divided solid diluent, between an organic aromatic cyclic compound and a mercury compound taken from a group consisting of a mercuric salt and mercuric oxide, and obtaining the mercurized product directly in dust form.

4. The process of making disinfectants which comprises effecting a reaction by grinding in the dry state, at greater than room temperature and in the presence of a finely divided diluent, between an organic aromatic cyclic compound and a mercury compound taken from a group consisting of a mercuric salt and mercuric oxide, and obtaining the mercurized product directly in dust form.

5. The process of making disinfectants which comprises effecting a reaction by grinding in the dry state between a phenolic compound and a mercury compound taken from a group consisting of a mercuric salt and mercuric oxide, and obtaining the mercurized product directly in dust form.

6. The process of making disinfectants which comprises effecting a reaction by grinding in the dry state and in the presence of a finely divided solid diluent, between a phenolic compound and a mercury compound taken from a group consisting of a mercuric salt and mercuric oxide, and obtaining the mercurized product directly in dust form.

7. The process of making disinfectants which comprises effecting a reaction by grinding in the dry state, at greater than room temperature and in the presence of a finely divided solid diluent, between a phenolic compound and a mercury compound taken from a group consisting of a mercuric salt and mercuric oxide, and obtaining the mercurized product directly in dust form.

8. The process of making disinfectants which comprises effecting a reaction by grinding in the dry state, between a chlorphenol and a mercury compound taken from a group consisting of a mercuric salt and mercuric oxide, and obtaining the mercurized product directly in dust form.

9. The process of making disinfectants which comprises effecting a reaction by grinding in the dry state, at greater than room temperature and in the presence of a finely divided solid diluent, between a chlorphenol and a mercury compound taken from a group consisting of a mercuric salt and mercuric oxide, and obtaining the mercurized product directly in dust form.

10. The process of making disinfectants which comprises effecting a reaction by grinding in the dry state, between a cresol and a mercury compound taken from a group consisting of a mercuric salt and mercuric oxide, and obtaining the mercurized product directly in dust form.

11. The process of making disinfectants which comprises effecting a reaction by grinding in the dry state between a phenolic compound and mercuric chloride, and obtaining the mercurized product directly in dust form.

12. The process of making disinfectants which comprises effecting a reaction by grinding in the dry state, at greater than room temperature, and in the presence of a finely divided diluent, between a phenolic compound and mercuric chloride, and obtaining the mercurized product in dust form.

13. The process of making disinfectants which comprises effecting a reaction by grinding in the dry state between a chlorphenol and mercuric chloride, and obtaining the mercurized product directly in dust form.

14. The process of making disinfectants which comprises effecting a reaction by grinding in the dry state, at greater than room temperature, and in the presence of a finely divided diluent, between a chlorphenol and mercuric chloride, and obtaining the mercurized product in dust form.

15. The process of making disinfectants which comprises effecting a reaction by grinding in the dry state between a cresol and mercuric chloride, and obtaining the mercurized product directly in dust form.

16. The process of making disinfectants which comprises effecting a reaction by grinding in the dry state, at greater than room temperature, and in the presence of a finely divided diluent, between a cresol and mercuric chloride, and obtaining the mercurized product in dust form.

In testimony whereof, I affix my signature.

MAX ENGELMANN.